Nov. 16, 1943.   E. H. LAND   2,334,418
SIGNAL LIGHT CONSTRUCTION
Filed Dec. 8, 1937

INVENTOR.
Edwin H. Land
BY
Brown & Jones
ATTORNEYS.

Patented Nov. 16, 1943

2,334,418

UNITED STATES PATENT OFFICE 2,334,418

SIGNAL LIGHT CONSTRUCTION

Edwin H. Land, Wellesley Farms, Mass., assignor, by mesne assignments, to Polaroid Corporation, Dover, Del., a corporation of Delaware Application December 8, 1937, Serial No. 178,696

8 Claims. (Cl. 177—329)

This invention relates to a light signal, such as a traffic signal, and more specifically to a light signal which is to be used in sunlight or in the presence of other light sources.

In general it is an object of the invention to provide a device of the character described which will efficiently perform the purposes for which it is intended, which is simple and economical of construction, which can be expeditiously, conveniently and safely manipulated, and which can be readily manufactured and assembled.

Other objects of the invention are to provide a signal light which, in the presence of other outer light sources, and more particularly sunlight, delivers its light signals independently of and undisturbed by said outer sources; to provide such a signal lamp which does not appear to be illuminated except when its own source is in operation and which does not give false or phantom images, signals or lights; to provide such a lamp which uses colored, filtered light; to provide such a lamp which utilizes the same means to do away with undesired reflections and to give, if desired, a special light quality to that light beam which is being used as a signal; to provide such a lamp in spite of, and with the intentional addition of, reflectors of moderate curvature for the principal light source; and to provide an attachment for accomplishing the desired results which may be simply, easily and readily affixed to earlier types of devices which do not have the above-mentioned advantages.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing, in which.

Figure 1:
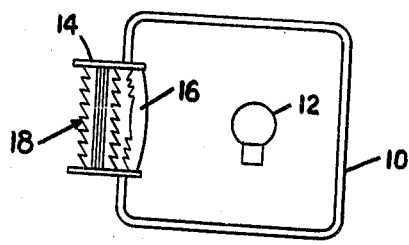
Figure 1 is a somewhat diagrammatic vertical view of a device embodying one form of the invention.

Heretofore, in connection with signal lights, there has always been the possibility and danger that the illumination which an observer has seen present in the window of the signal lamp did not arise from the source of light in the signal lamp, but arose from a fortuitous reflection of light from some casual or extraneous source. These false or phantom images have themselves occasionally been as bright as the signal when lighted by its own proper light source. Thus, when an observer stands with his back to a low afternoon sun and looks toward a signal light, the sunlight may so brightly illuminate the filament of the bulb within the signal housing, or may be reflected from the surface of the signal window, or from the color filter, or even from reflecting surfaces in the interior of the signal lamp, as to create a false or phantom signal apparently emanating from the signal lamp itself. All of this light, and especially that reflected light which has passed twice through the color filter, appears to an observer exactly the same as though it had come from the light source in the signal lamp. The present invention does away with the before-mentioned phantom images and casual reflections.

In the drawing, 10 denotes generally the casing of a signal lamp having a light source 12 therein. A window 14 provides the usual lens 16 and means for preventing the emission of reflected light with which latter means there may be incorporated a color filter. The reflection-suppressing means 18 may preferably be positioned in front of the lens 16 and may comprise the following means positioned successively away from the lamp 12. Transparent means 20, a color filter 22, means 24 for introducing a difference of phase of the polarized electric components of the light transmitted, means 26 for polarizing transmitted light, and transparent means 28. The transparent means 20 may comprise a glass or other transparent plate providing preferably a plurality of successive faces 21 so inclined that normals to those faces, in the air, extend slightly upward for a purpose to be described below. The color filter 22 may be of any known type. The phase-retardation means 24 may preferably comprise a sheet-like quarter-wave plate. The polarizing means 26 may be a sheet of light-polarizing material, such as that sold under the trade name "Polaroid." The polarizing element and the quarter-wave device should be so assembled as to form a circular polarizer; i. e., the principal axes of vibration of the quarter-wave plate should be positioned at an angle of 45° to the polarizing axis of the polarizer. The transparent means 28 may be preferably a duplicate of the element 20, save that the faces 29 of the element 28 are preferably parallel to the corresponding faces 21 of the element 20. The various parts may be cemented together, preferably with a material having the same index of refraction as the parts 20 and 28 to minimize reflections at the surfaces so united. The surfaces 21, 29 of the glass plates are preferably parallel to each other. Hence light which enters the unit from either side leaves the unit from the other side parallel with, and but slightly displaced from, the incident light.

Figure 2:
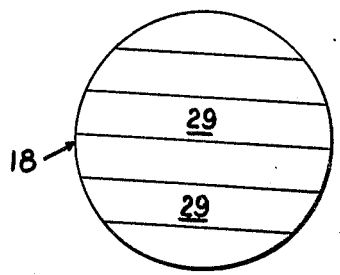
Fig. 2 is a front and side view of the reflection-preventing means shown in Fig. 1.
Figure 2A:
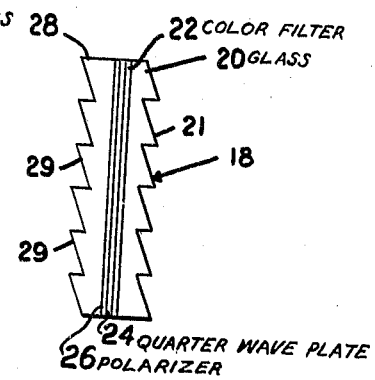

It will be obvious that the device shown in Fig. 2 may be made in the form of an attachment for use with existing signals.

The operation of the device is as follows: Suppose that a beam of light from some outside source, such as the sun, strikes plate 28. Even if that light is at normal incidence, there will be a very small amount of uncolored, reflected light. This will be reflected downward toward the ground, by the faces 29, away from an observer. The rest of the casual light will pass through polarizer 26, leaving the latter plane-polarized. It will then pass through the quarter-wave plate 24 and leave that plate as a circularly polarized beam. Thereafter it may be specularly reflected from either surface of the filter 22 or of the plate 20, or from any reflecting surface of the lens 16 or the casing 10, or from the filament of the bulb 12, or any other surface, such as a reflector of moderate curvature within the casing 10, and come back to the quarter-wave plate 24. By passing through that plate again, the circularly polarized light is converted into plane polarized light vibrating in a direction in which it would have vibrated had it passed through a half-wave retardation plate instead of having passed twice through the quarter-wave retardation plate.

It is the well-known property of a half-wave retardation plate that it generally rotates the plane of polarization of plane polarized light traversing it. In particular, when the plane of polarization of the incident plane polarized light bisects the right angle between the principal directions of vibration of light in the plane of the half-wave plate, the rotation of the plane of polarization of the light brought about by the action of the half-wave plate is 90°.

If, for instance, the polarizer 26 is so oriented as to transmit only vertical light vibrations, and if the quarter-wave plate 24 then is so oriented that its principal directions of vibration are respectively inclined at 45° to the polarizing axis of the polarizer 26, then any light having traversed this system from the outside and having been reflected back upon itself from any surface within the signal lamp will, on having traversed the quarter-wave plate a second time, be reconverted into plane polarized light, whose plane of polarization is at right angles to the polarizing axis of the polarizer 26. The polarizer 26 will, therefore, quench this light and prevent it from emerging from the signal lamp. An observer, looking at the device, sees no reflected light.

On the other hand, light emitted from light source 12, not being polarized, is to all intents and purposes unaffected by its passage through the quarter-wave plate, but is plane-polarized by its passage through the polarizer 26. The plane of this polarization may be set at a predetermined position and made useful as a supplementary signalling device, green lights for example having their polarizers set to polarize in one plane and red lights having their polarizers set to polarize in another plane. The observers may then be provided with analyzing polarizers by means of which they can verify signals.

Figure 3:
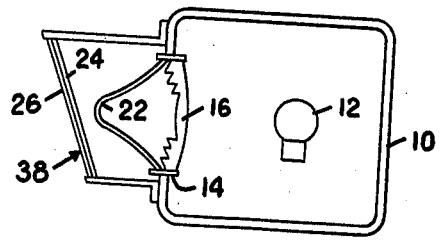
Figs. 3 and 4 are modifications of the device shown in Fig. 1.

Fig. 3 shows a modification in which the lens 16 and the filter 22 are in a shape heretofore used. By having the filter generally in the shape of a circular pyramid, it was attempted to divert reflections arising at the filter away from the direction of the axis of the pyramid. It was assumed that the observer would be positioned along that axis. This correction for an observer at a single position was not complete even for an observer in that position, and it made no correction for light which got through the filter into the casing, for example, on to the bulb filament, and was reflected back out.

By placing a phantom-image destroyer 38 in front of the filter 22, all reflected light which goes through the element 38 is blocked from returning out through element 38. This element may comprise the polarizer 26 and the quarter-wave plate 24, the latter being nearer the filter 22.

In order to get rid of the very small percentage of light which might be reflected from the surface of element 26, the unit 38 is preferably placed at a slight angle with the vertical.

There are two mutually perpendicular directions normal to the beam which identify the principal directions of vibration of polarized light traversing the inclined quarter-wave plate. There is a certain direction normal to the beam which identifies the plane of polarization of the beam traversing the inclined sheet of "Polaroid." The unit 38 should be so assembled that the last-mentioned direction bisects the right angle between the said two mutually perpendicular directions.

The angle of inclination of the unit 38 should be made as small as practicable in order not to introduce an unnecessary reduction of the degree of polarization of light traversing the sheet of "Polaroid" in the inclined direction. This factor, however, need not be considered if the inclination of the unit 38 is made either about the polarizing axis of the sheet of "Polaroid" or about an axis at right angles to it.

It should be noted that the retardation plate which is to be the quarter-wave plate in the inclined unit 38 must now be of such a nature that it is a quarter-wave plate for light traversing it at the appropriate angle, instead of normally.

Figure 4:
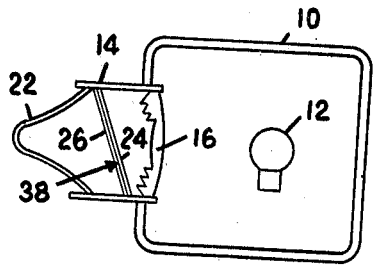

Fig. 4 shows another modified form of the device in which the unit 38 is inserted in an existing signal light between the filter 22 and the lens 16, the polarizer 26 being on the side toward the filter 22. While this modification of old devices is not as satisfactory as that shown in Fig. 3, because it does not completely eliminate reflections from the filter, it is nevertheless a great improvement in that it cuts off all other reflections, the most disturbing of which is probably the reflection from the bulb filament.

Figure 5:
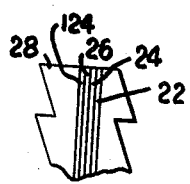
Fig. 5 is a modification of the means shown in Fig. 2.

Fig. 5 shows a modification of the reflection-blocking unit in which a quarter-wave plate 124 is added between the polarizer 26 and the outer glass plate 28. The quarter-wave plate has no effect on the incoming heterogeneously vibrating casual light. It does, however, act upon the light which is emitted initially by the lamp 12 and which has been polarized by polarizer 26. Its effect upon that light is to circularly-polarize it. An observer may be fitted with corresponding circular polarizers. Furthermore, if for any reason it becomes desirable to project a beam which is not polarized, means to depolarize the beam emitted from the lamp housing may be provided and, in Fig. 5, the element 124 may be understood as representing a de-polarizer instead of a quarter-wave plate. For example, it may be opal glass.

In former devices mirrors or reflectors could not be used freely with the signal lamp without the danger of strong phantom signals and hence were rarely used except for certain specially positioned small mirrors which it was hoped would not catch casual light. With the present device, it is not only possible to use reflectors within the casing 10, but it is desirable, since they increase the light coming from the controlled source 12 and such casual light as they reflect is blocked by the unit 18.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination with a signal lamp including a light source, means for suppressing phantom signals from said lamp, said suppressing means being positioned between said light source and an observer, said suppressing means comprising means for circularly polarizing light incident on said source from the direction of the said observer.

2. An attachment for signal lamps, indicators or the like, comprising means to substantially circularly polarize light from outer sources incident on said lamp, and means for positioning said circularly polarizing means to intercept said light both before and after said light is incident on said lamp, said circularly polarizing means having cemented thereto a color filter.

3. An attachment for suppressing phantom signals comprising a plurality of light-transmitting elements having positioned therebetween a light polarizing sheet and a quarter-wave plate to circularly polarize light transmitted by said sheet in one direction, all of said elements being cemented together, said light-transmitting elements having incident surfaces formed of lenticules to reflect incident light away from an observer.

4. A signal unit comprising a light source and means disposed in the path of light rays passing from and toward the source for suppressing phantom and false signals, said means transmitting light from outside toward the source but being polarized to suppress substantially the passage of redirected light from adjacent the source.

5. A signal device including a housing, a signal lamp within the housing, and means disposed in the path of light rays passing from and into the housing for suppressing phantom and false signals, said means comprising light polarizing means transmitting light from the outside into the housing but blocking the passage of redirected light from within the housing.

6. A signal device including a housing, a signal lamp within the housing, and means for suppressing phantom signals, said means being positioned to intercept light rays entering the housing and reflected from the vicinity of the lamp and comprising a composite sheet polarized to suppress substantially the passage of redirected light from within the housing.

7. A signal device including a housing and a signal lamp within said housing, and means disposed in the path of light rays passing from and into said housing for suppressing phantom and false signals, said means comprising means for circularly polarizing light passing from the outside into said housing.

8. A signal device including a housing, a signal lamp within said housing, and means for suppressing phantom signals, said means being positioned to intercept light rays entering said housing and reflected from the vicinity of said lamp and comprising a composite sheet adapted to circularly polarize light entering said housing.

EDWIN H. LAND.